US009501604B1

(12) United States Patent
More et al.

(10) Patent No.: US 9,501,604 B1
(45) Date of Patent: Nov. 22, 2016

(54) TESTING CRITICAL PATHS OF A CIRCUIT DESIGN

(71) Applicant: Xilinx, Inc., San Jose, CA (US)

(72) Inventors: Geetesh More, Delhi (IN); Srinivasan Dasasathyan, Secunderabad (IN); Nagaraj Savithri, Plano, TX (US)

(73) Assignee: XILINX, INC., San Jose, CA (US)

( * ) Notice: Subject to any disclaimer, the term of this patent is extended or adjusted under 35 U.S.C. 154(b) by 150 days.

(21) Appl. No.: 14/493,750

(22) Filed: Sep. 23, 2014

(51) Int. Cl.
*G06F 17/50* (2006.01)

(52) U.S. Cl.
CPC ....... *G06F 17/5077* (2013.01); *G06F 17/5031* (2013.01); *G06F 17/5054* (2013.01); *G06F 17/5081* (2013.01); *G06F 2217/84* (2013.01)

(58) Field of Classification Search
None
See application file for complete search history.

(56) References Cited

U.S. PATENT DOCUMENTS

| 6,105,153 | A  | * | 8/2000  | Yamada    | G01R 31/31857 714/724 |
|-----------|----|---|---------|-----------|-----------------------|
| 6,232,845 | B1 | * | 5/2001  | Kingsley  | G01R 27/04 324/617    |
| 6,891,395 | B2 | * | 5/2005  | Wells     | G06F 17/5054 326/38   |
| 7,506,229 | B2 | * | 3/2009  | Alam      | G06F 17/505 714/724   |
| 7,617,470 | B1 | * | 11/2009 | Dehon     | G06F 17/5054 716/116  |
| 7,921,402 | B2 | * | 4/2011  | He        | G06F 17/5022 703/16   |
| 8,176,461 | B1 | * | 5/2012  | Trimberger| G06F 17/5036 703/19   |
| 8,531,225 | B1 | * | 9/2013  | Hussain   | H03K 5/133 327/276    |
| 9,075,104 | B2 | * | 7/2015  | Carmon    | G01R 31/2851          |
| 2012/0072881 | A1 | * | 3/2012 | Kobayashi | G06F 17/5031 716/130 |
| 2013/0311799 | A1 | * | 11/2013 | Fitzpatrick | G06F 1/3296 713/320 |

OTHER PUBLICATIONS

Arabi et al., "Dynamic digital integrated circuit testing using escillation-test method," Electronics Letters, vol. 34, No. 8, 16th Apr. 1998, pp. 762-764.*
Elgebaly et al., "Efficient Adaptive Voltage Scaling System Through On-Chip Critical Path Emulation," ISLPED'04 2004 ACM, pp. 375-380.*
Kitani et al., "A90nm 8×16 LUT-based FPGA Enhancing Speed and Yield Utilizing Within-Die Variations," 2006 IEEE, pp. 110-113.*
Mojumder et al., "Novel Critical Path Aware Transistor Optimization for Mobile SoC Device-Circuit Co-design," 2014 Symposium on VLSI Technology Digest of Technical Papers, IEEE, 2 pages.*
Vermaak et al., "Using a Pulsed Supply Voltage for Delay Faults Testing of Digital Circuits in a Digital Oscillation Environment," IEEE Africon 2002, pp. 47-52.*
Wang et al., "Path-RO: A Novel On-Chip Critical Path Delay Measurement Under Process Variations," 2008 IEEE/ACM Int'l Conference on CAD, pp. 640-646.*
K. Arabi et al., "Digital Oscillation-Test Method for Delay and Stuck-at Fault Testing of Digital Circuits," 1998 IEEE Int'l Tst Conference, pp. 91-100.*
Specification and drawings for U.S. Appl. No. 14/294,406, filed Jun. 3, 2014, Savirthri et al.

* cited by examiner

*Primary Examiner* — Leigh Garbowski
(74) *Attorney, Agent, or Firm* — LeRoy D. Maunu

(57) ABSTRACT

A method of testing a circuit design includes generating, for each net of each critical path in the circuit design, a respective ring oscillator circuit design. The ring oscillator circuit design has a source gate coupled to a destination gate via the net and a feedback path that couples an output pin of the destination gate to an input pin of the source gate. Configuration data are generated to implement a respective ring oscillator circuit from each ring oscillator circuit design, and a programmable integrated circuit is configured with the configuration data. The method determines a delay of the net of each ring oscillator circuit.

20 Claims, 4 Drawing Sheets

TESTING CRITICAL PATHS OF A CIRCUIT DESIGN

TECHNICAL FIELD

The disclosure generally relates to the analysis of a circuit design for compliance with timing requirements.

BACKGROUND

Programmable logic devices (PLDs) are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

The process of implementing a circuit design on a programmable IC often involves verifying whether or not the circuit design meets timing requirements. The timing requirements may be specified in terms of a maximum clock frequency at which the implemented circuit may operate. In some instances, a failure of a circuit to comply with timing requirements may not be discovered until the circuit design has been placed and routed. Critical paths, which are the paths of the circuit design that do not satisfy timing constraints, may be identified through use of various design tools. However, fixing critical paths may be problematic in instances in which each critical path is made of many nets. The challenge is compounded in a complex design that might have many critical paths.

SUMMARY

A method of testing a circuit design includes generating, for each net of each critical path in the circuit design, a respective ring oscillator circuit design. The ring oscillator circuit design has a source gate coupled to a destination gate via the net and a feedback path that couples an output pin of the destination gate to an input pin of the source gate. Configuration data are generated to implement a respective ring oscillator circuit from each ring oscillator circuit design, and a programmable integrated circuit is configured with the configuration data. The method determines a delay of the net of each ring oscillator circuit.

Another method of testing a circuit design includes generating for each net of each critical path in the circuit design, in response to a first state of a user control input, a respective ring oscillator circuit design. Each ring oscillator circuit design has a source gate coupled to a destination gate via the net and a feedback path that couples an output pin of the destination gate to an input pin of the source gate. In response to a second state of the user control input, the method selects a subset of nets of one or more critical paths in the circuit design based on input selection criteria. Also in response to the second state of the user control input, the method generates for each net of the subset of nets, a respective ring oscillator circuit design. The method generates configuration data to implement a respective ring oscillator circuit from each ring oscillator circuit design and configures a programmable integrated circuit with the configuration data. The method determines a delay of the net of each ring oscillator circuit.

Other features will be recognized from consideration of the Detailed Description and Claims, which follow.

BRIEF DESCRIPTION OF THE DRAWINGS

Various aspects and features of the methods will become apparent upon review of the following detailed description and upon reference to the drawings, in which.

DETAILED DESCRIPTION

Figure 1:
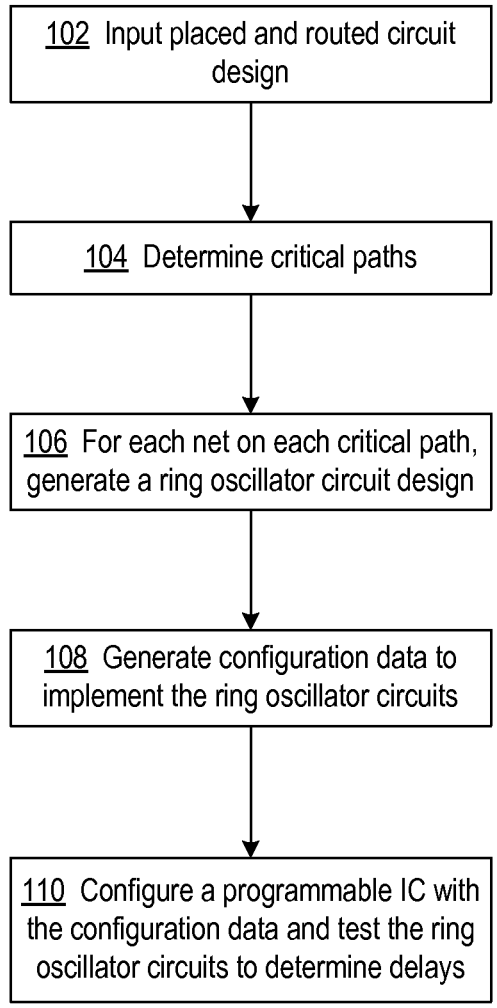
FIG. 1 is a flowchart of a process for testing delays of critical paths in a circuit design.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods for testing a circuit design generally entail dividing critical paths of the circuit design into individual nets and testing the individual nets for compliance with timing requirements. For each net of each critical path in the circuit design, a respective ring oscillator circuit design is generated. The ring oscillator circuit design has a source gate that is coupled to a destination gate by the net and a feedback path that couples an output pin of the destination gate to an input pin of the source gate. Configuration data are generated from the ring oscillator circuit design to implement respective ring oscillator circuits. The configuration data implement each ring oscillator circuit on a programmable IC. Each ring oscillator circuit may then be individually tested for compliance with timing requirements or to identify which nets may be contributing significantly to signal delays. Data gathered in testing each ring may be further used to update speed files that characterize the particular programmable IC. The updated speed files may provide more accurate timing estimates in simulating circuit designs.

FIG. 1 is a flowchart of a process for testing delays of critical paths in a circuit design. A placed and routed circuit design is input at block 102. The placed and routed circuit design specifies locations of circuit design components on a target IC and the routes for signal paths between the circuit design components. On a programmable IC, for example, logic circuitry of the circuit design is mapped to specific programmable logic resources of the programmable IC, and signals of the circuit design are mapped to specific programmable interconnect resources. Programmable interconnect resources may alternatively be referred to as programmable routing resources.

At block 104, critical paths of the circuit design are determined. The critical paths may be determined by simulating the placed and routed circuit design, and selecting the paths that do not satisfy timing constraints as the critical paths. Alternatively, the critical paths may be determined in response to input data that specify which paths are critical. The input data may be specified by the circuit designer, for example. The critical paths may also be determined by selecting some number of paths that are the slowest (the slowest n paths).

For each critical path, the nets that comprise the critical path are identified and a respective ring oscillator circuit design is generated for each net at block 106. Each ring oscillator circuit design has a source gate that is coupled to a destination gate by the net. In a programmable IC implementation, for example, the source and destination gates may be lookup tables (LUTs) that are configured to implement inverters. Each ring oscillator circuit design further includes a feedback path that couples an output pin of the destination gate to an input pin of the source gate.

At block 108, configuration data are generated for implementing the ring oscillator circuit designs. A design tool that performs synthesis, mapping, placing, routing, and generating of configuration data may be used to translate the ring oscillator circuit designs into configuration data for a programmable IC, for example. In an example implementation, the placing and routing of each ring oscillator circuit design uses constraints that describe particular resources to use in routing from the source gate to the destination gate. The constraints may specify the types and locations of the resources on a target device.

A programmable IC is configured with the configuration data, and the ring oscillator circuits are tested at block 110. Conventional equipment may be used to configure the programmable IC to implement the ring oscillator circuits and to test the maximum frequency of the ring oscillator circuits. The maximum frequency of the signal from destination gate indicates the total delay of the source gate, the net, and the destination gate. The delays of the source and destination gates may be known values and subtracted from the total delay to determine the delay of the net. The delay of the net may be displayed to a designer, and if the delay is greater than desired, the designer may constrain the connection from the source gate to the destination gates in the design to a different route. The delay of the net may also be saved to a speed file for subsequent use in simulation.

Figure 2:
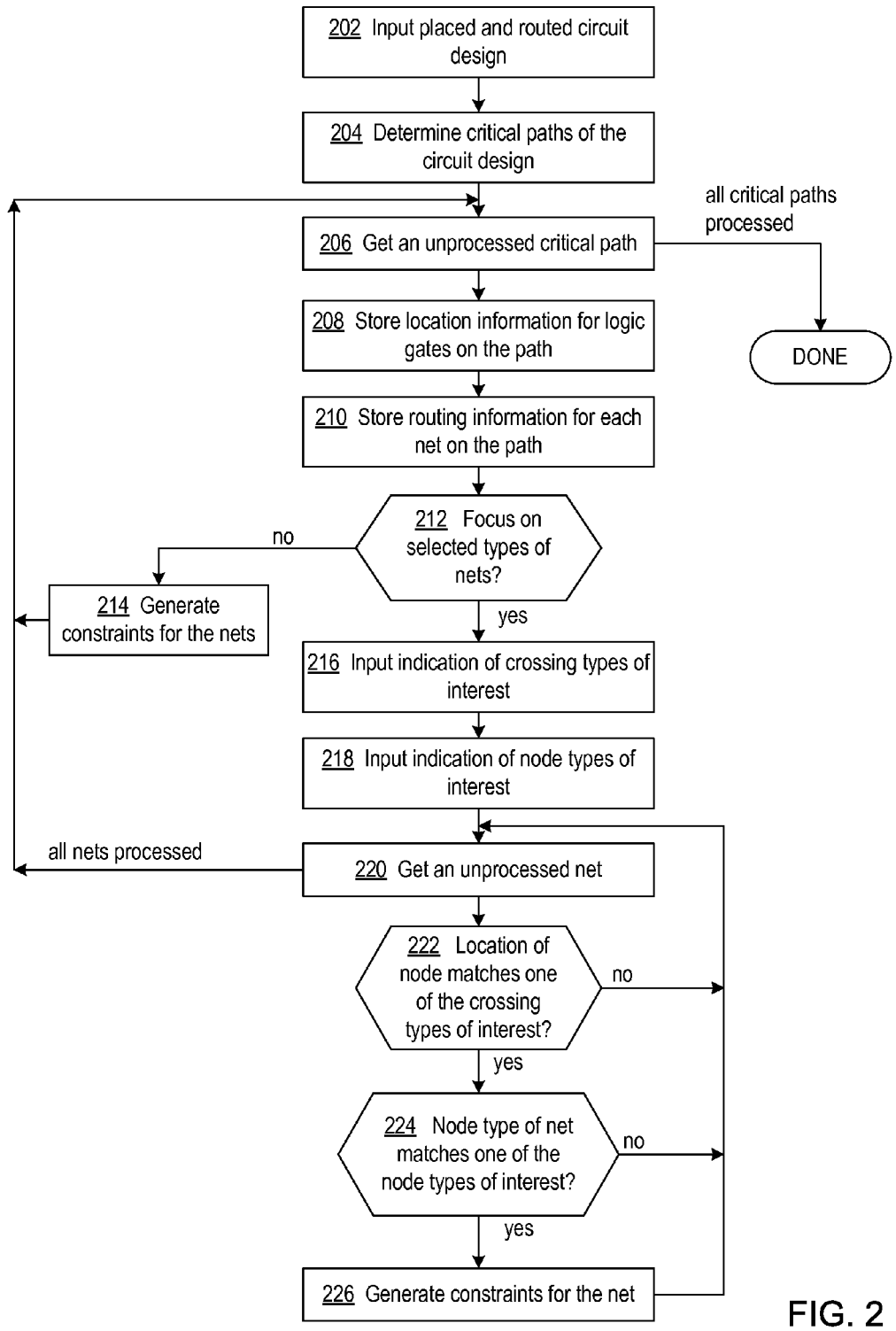
FIG. 2 is a flowchart of a process for gathering data that describe the nets in critical paths of a circuit design and generating constraints for ring oscillator circuits for the nets.

FIG. 2 is a flowchart of a process for gathering data that describe the nets in critical paths of a circuit design and generating constraints for ring oscillator circuits for the nets. For example, the constraints may be used to control the placing and routing of each ring oscillator circuit. By constraining placement and routing of the ring oscillator circuits, timing measurements of the ring oscillator circuits may more accurately reflect the timing of the nets within the context of the circuit design.

At block 202, a placed and routed version of the circuit design is input, and at block 204, the critical paths of the circuit design are determined as described above in association with FIG. 1. An unprocessed one of the critical paths is obtained for processing at block 206. Blocks 208 and 210 assemble respective sets of resources for the nets on the in-process critical path. At block 208, location information is stored for the logic gates on the critical path being processed. In a programmable IC, the logic gates may be LUTs, and the locations may be respective sets of x-y coordinates of the LUTS and respective sets of x-y coordinates of the I/O pins of the LUTs.

At block 210, routing information is determined and stored for each net on the critical path. The routing information may include the type of routing resource, which may be alternatively referred to as a "node," the location of the node, along with the sequence in which the routing resources are connected. In FPGAs from XILINX, Inc., for example, routing resources may include, single length, double length, quad length, and other types of signal lines. The location information and routing information of blocks 208 and 210 may be determined from the placed and routed version of the circuit design. Respective sets of location and routing information are stored in association with the nets.

At decision block 212, the process provides the circuit designer the option to focus the testing and analysis on particular types of nets or to test and analyze all the nets on the critical paths. The decision may be made based on user data such as the state of a control input as provided by a configuration parameter or interactively entered data. If the designer does not elect to focus on specific types of nets, the process proceeds to block 214 where constraints are generated for the nets in the in-process critical path. In an example implementation, the constraints may be commands to be input to a circuit design tool that places and routes the ring oscillator circuit designs. For example, for the ring oscillator circuit to be implemented for each net, the generated commands include one or more commands that specify the coordinates of and particular resources to use in implementing the source gate, one or more commands that specify the coordinates of and particular resources to use in implementing the destination gate, and one or more commands that specify particular routing resources and the order of those routing resources to be used in coupling the source gate to the destination gate. The process returns to block 206 from block 214 to begin processing of another unprocessed critical path.

In response to the circuit designer desiring to focus on selected types of nets, decision block 212 directs the process to block 216. At blocks 216 and 218, the process obtains selection criteria from the designer. The selection criteria describe characteristics of nets that are of interest. For example, at block 216, the process obtains crossing types that are of interest to the designer. Crossing types may be applicable to some FPGAs. For example, in some FPGAs from XILINX, the programmable routing resources may cross (in a different metal layer) columns of different types of programmable logic resources. Examples of these columns include columns of I/O blocks, memory interface blocks, and other types of circuit blocks. At block 218, the process obtains types of nodes that are of interest to the designer. For example in XILINX FPGAs, the node types may be single, double, quad, etc.

At block 220, an unprocessed net of the in-process critical path is obtained. Decision blocks 222 and 224 determine whether or not the net obtained at block 220 meets the criteria specified by the designer at blocks 216 and 218. If the location of the node indicates that the node crosses one of the crossing types of interest (decision block 222) and the node type matches one of the node types of interest (decision block 224), then constraints are generated for the net at block 226. Otherwise, the process bypasses generating constraints for the net and returns to block 220 to get an unprocessed one of the nets of the in-process critical path. Once all nets of the in-process critical path have been processed, the process returns to block 206 to get an unprocessed one of the critical paths for processing. The process is complete once all the critical paths have been processed.

For supporting testing of the desired ones of the nets, the processing of block 108 in FIG. 1 may generate configuration data to implement ring oscillator circuits for only those ring oscillator circuit designs for which constraints were generated. If constraints were generated for all the nets in a critical path at block 214, then configuration data is generated to implement respective ring oscillator circuits for all of those nets. If constraints were generated for only the nets in a critical path that match designer-specified selection criteria at block 226, then configuration data is generated to implement respective ring oscillator circuits for only the matching subset of nets.

Figure 3:
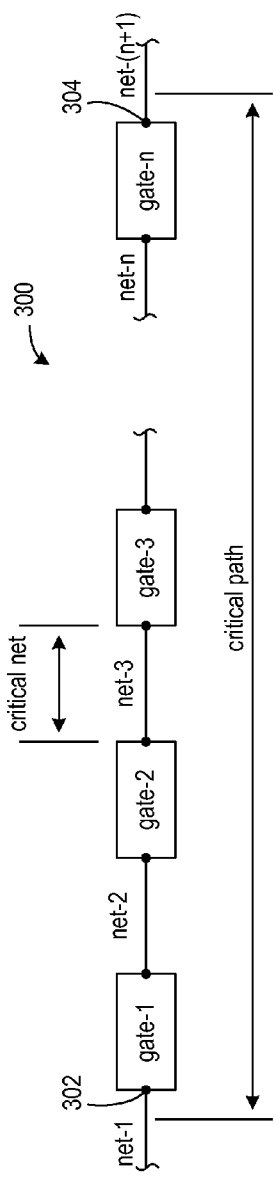
FIG. 3 shows an example of a critical path in a circuit design.

FIG. 3 shows an example of a critical path in a circuit design. The critical path 300 spans from the input pin 302 of gate-1 to the output pin 304 of gate-n. The critical path includes gate-1, gate-2, gate-3, . . . gate-n, with net-2 connecting gate-1 to gate-2, net-3 connecting gate-2 to gate-3, and net-n connecting gate-(n–1) (not shown) to gate-n. Each of the nets along the critical path may be referred to as a critical net. Each of gate-1 through gate-n may be a LUT such as those in FPGAs.

Figure 4:
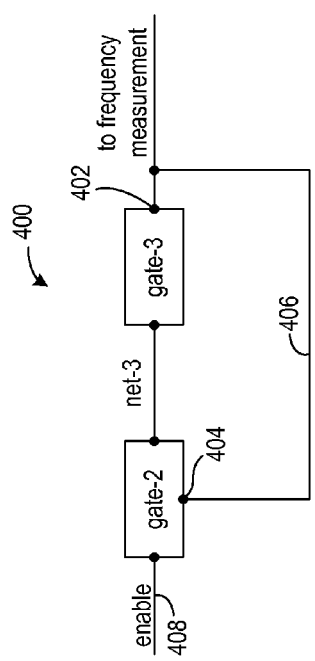
FIG. 4 shows a ring oscillator circuit constructed from one of the nets in the critical path of FIG. 3.

FIG. 4 shows a ring oscillator circuit constructed from one of the nets in the critical path 300 of FIG. 3. The ring oscillator circuit 400 includes a source gate (gate-1) that is coupled to a destination gate (gate-3) via net-3. The signal from the output pin 402 of gate-3 is fed back to input pin 404 of gate-2 on feedback path 406. An individual ring oscillator circuit, such as circuit 400, is generated in the process of FIG. 1 for each net to be analyzed.

In an example implementation, the source and destination gates of the ring oscillator circuit are LUTs of a programmable IC, and the LUTs are configured to operate as inverters. The enable signal 408 is provided to gate-2 to enable oscillating of the signal output from gate-2. The frequency of the output signal from gate-3 is measured using standard frequency measurement techniques, thereby providing an indication of the delay from input pin 404 of gate-2 to output pin 402 of gate-3.

Figure 5:
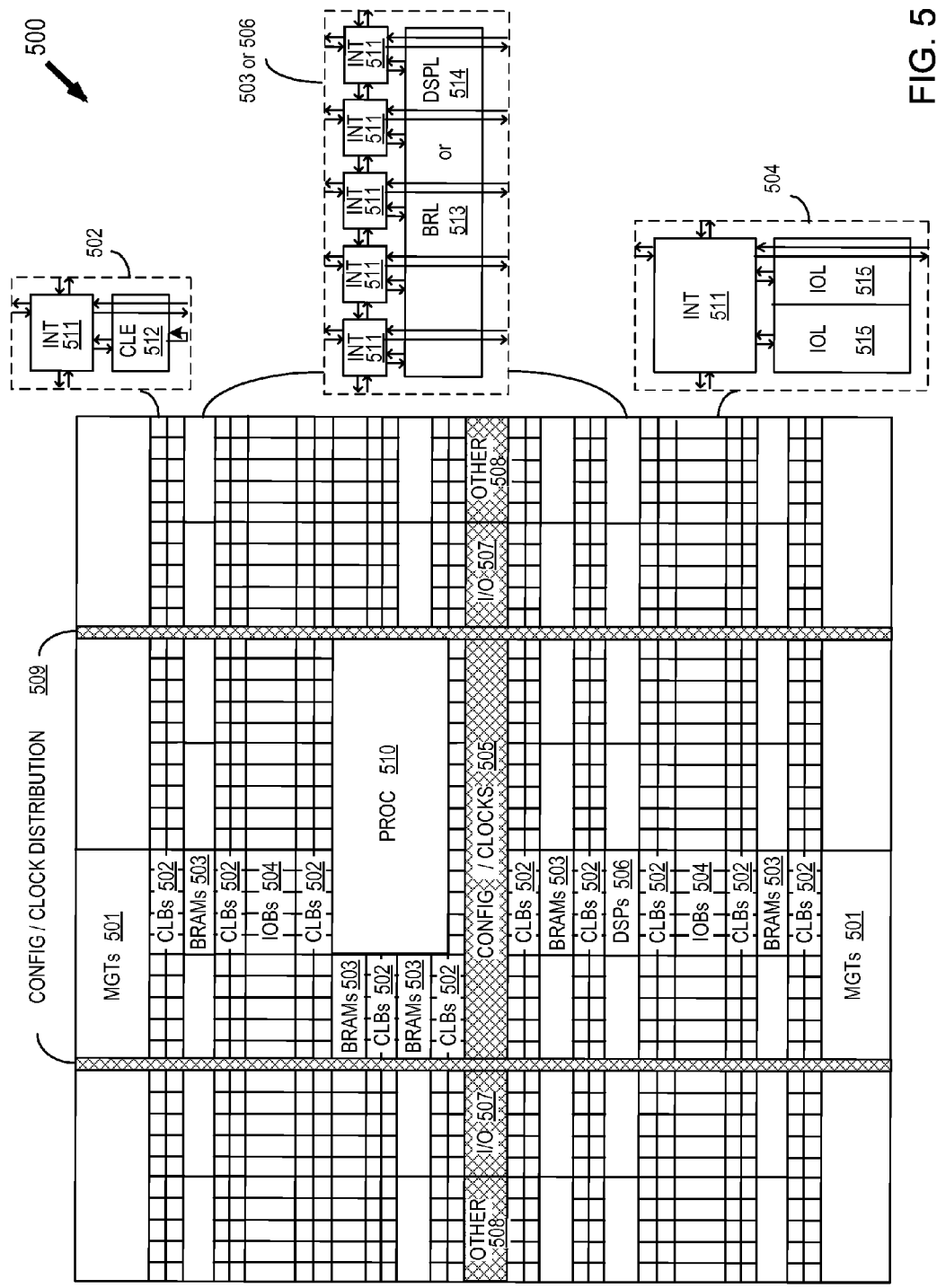
FIG. 5 shows a programmable integrated circuit (IC) on which the disclosed circuits may be implemented.

FIG. 5 shows a programmable integrated circuit (IC) 500 on which the disclosed circuits may be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. A BRAM tile has the same height as five CLBs, but other numbers (e.g., four) can also be used. A DSP tile 506 can include a DSP logic element (DSPL) 514 in addition to an appropriate number of programmable interconnect elements. An 10B 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

A columnar area near the center of the die (shown shaded in FIG. 5) is used for configuration, clock, and other control logic. Horizontal areas 509 extending from this column are used to distribute the clocks and configuration signals across the breadth of the programmable IC.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Figure 6:
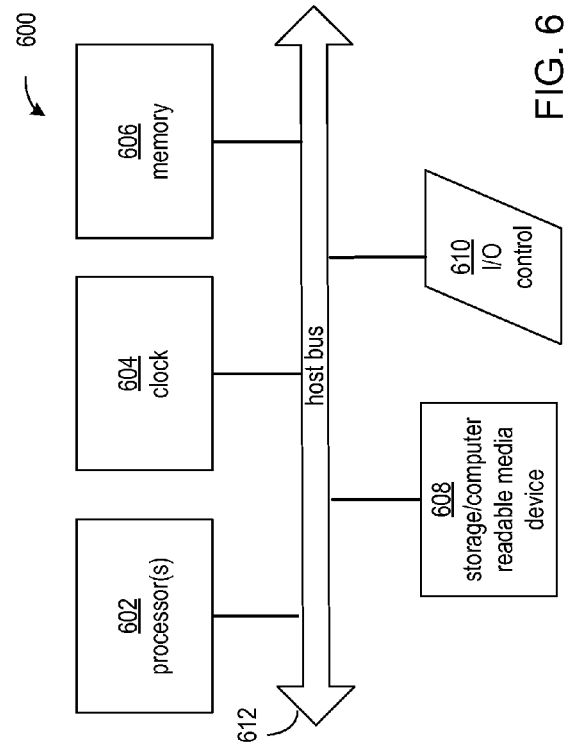
FIG. 6 shows a block diagram of an example computing arrangement that may be configured to implement the data structures and processes described herein.

FIG. 6 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory arrangement 606, a storage arrangement 608, and an input/output control unit 610, all coupled to a host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory, and a main memory. The storage arrangement 608 may include local and/or remote persistent storage, such as provided by magnetic disks (not shown), flash, EPROM, or other non-volatile data storage. The storage unit may be read or read/write capable. Further, the memory arrangement 606 and storage arrangement 608 may be combined in a single arrangement.

The processor(s) 602 executes the software in storage arrangement 608 and/or memory arrangement 606, reads data from and stores data to the storage arrangement 608 and/or memory arrangement 606, and communicates with external devices through the input/output control arrangement 610. These functions are synchronized by the clock signal generator 604. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods are thought to be applicable to a variety of systems for testing and analyzing circuit designs. Other aspects and features will be apparent to those skilled in the art from consideration of the specification. It is intended that the specification and drawings be considered as examples only, with a true scope of the invention being indicated by the following claims.

What is claimed is:

1. A method of testing a circuit design, comprising:
   inputting the circuit design to a processor, wherein the circuit design includes a plurality of critical paths, and each critical path includes a plurality of nets
   generating by the processor, for each net of each critical path of the plurality of critical paths in the circuit design, a respective ring oscillator circuit design having a source gate coupled to a destination gate via the net and a feedback path that couples an output pin of the destination gate to an input pin of the source gate;
   generating configuration data to implement a respective ring oscillator circuit from each ring oscillator circuit design;
   configuring a programmable integrated circuit with the configuration data; and
   determining a delay of the net of each ring oscillator circuit.

2. The method of claim 1, further comprising determining the critical paths from a placed and routed version of the circuit design.

3. The method of claim 2, wherein the determining the critical paths includes inputting by a computing arrangement, user data that indicate the critical paths.

4. The method of claim 2, wherein the determining the critical paths includes determining paths of the circuit design that violate timing constraints.

5. The method of claim 2, further comprising determining for each net of each of the critical paths, a respective set of resources used in the net.

6. The method of claim 5, further comprising generating for each net, constraints that describe the respective set of resources for implementing each ring oscillator circuit.

7. The method of claim 6, wherein the generating the configuration data to implement the respective ring oscillator circuit from each ring oscillator circuit design includes placing and routing the ring oscillator circuit design with the constraints that describe the respective set of resources.

8. The method of claim 6, wherein the constraints describe types of routing resources in a programmable integrated circuit.

9. The method of claim 8, wherein the constraints describe locations of the routing resources.

10. A method of testing a circuit design, comprising:
    inputting by a computing arrangement, a user control input;
    inputting the circuit design to a processor, wherein the circuit design includes a plurality of critical paths, and each critical path includes a plurality of nets
    in response to a first state of the user control input:
       generating by the processor, for each net of each critical path of the plurality of critical paths in the circuit design, a respective ring oscillator circuit design having a source gate coupled to a destination gate via the net and a feedback path that couples an output pin of the destination gate to an input pin of the source gate;
    in response to a second state of the user control input:
       selecting a subset of nets of one or more critical paths in the circuit design based on input selection criteria; and
       generating by the processor a respective ring oscillator circuit design for each net of the subset of nets only;
    generating configuration data to implement a respective ring oscillator circuit from each ring oscillator circuit design;
    configuring a programmable integrated circuit with the configuration data; and
    determining a delay of the net of each ring oscillator circuit.

11. The method of claim 10, wherein the selection criteria specify types of routing resources.

12. The method of claim 10, wherein the selection criteria specify types of resources of the programmable integrated circuit over which routing resources cross.

13. The method of claim 10, further comprising determining the critical paths from a placed and routed version of the circuit design.

14. The method of claim 13, wherein the determining the critical paths includes inputting by a computing arrangement, user data that indicate the critical paths.

15. The method of claim 13, wherein the determining the critical paths includes determining paths of the circuit design that violate timing constraints.

16. The method of claim 13, further comprising determining for each net of each of the critical paths, a respective set of resources used in the net.

17. The method of claim 16, further comprising:
   in response to the first state of the user control input:
      generating, for each net, constraints that describe the respective set of resources for implementing each ring oscillator circuit; and
   in response to the second state of the user control input:
      generating, for each net of the subset of nets only, constraints that describe the respective set of resources for each ring oscillator circuit.

18. The method of claim 17, wherein the generating the configuration data to implement the respective ring oscillator circuit from each ring oscillator circuit design includes placing and routing the ring oscillator circuit design with the constraints that describe the respective set of resources.

19. The method of claim 17, wherein the constraints describe types of routing resources in the programmable integrated circuit.

20. The method of claim 19, wherein the constraints describe locations of the routing resources.

* * * * *